Patented May 30, 1944

2,350,007

UNITED STATES PATENT OFFICE 2,350,007

PROCESS OF HEAT-TREATING POLYMERIZATION PRODUCTS

Carl Zerbe, Hamburg, Germany; vested in the Alien Property Custodian

No Drawing. Application October 14, 1940, Serial No. 361,195. In Germany October 30, 1939

5 Claims. (Cl. 260—36)

This invention relates to heat-treating polymerization products of butadiene and its homologues and mixed polymerization products thereof.

According to a known process, the workability of polymerization products of butadiene, its homologues and mixed polymerization products thereof with styrene and acrylonitrile is improved by heating to temperatures of 120° to 170° C. and simultaneous partial oxidation by the air present or other oxyen yielding agents. It is entirely due to this so-called thermal decomposition that some products of this class can be utilized practically.

It has been found now that this process can be improved by carrying out the heat-treatment of the polymerization products or mixed polymerization products in the presence of organic difficultly volatile substances having a swelling effect thereon, such as the preferably polycyclic hydrocarbons or hydrocarbon mixtures obtained in the refining of mineral oils and wholly or partly soluble in concentrated sulfuric acid. The process may be applied in the presence of air or of air enriched by oxygen or in an atmosphere of indifferent gas. Compared with the known addition of these substances to the polymerization products mentioned after thermal decomposition, the process affords the advantage of more intense swelling and better distribution of the usually compact particles of these products.

Particularly suitable in this respect are for example the hydrocarbon mixtures obtainable from the residue accruing in refining mineral oils with concentrated sulfuric acid or selective solvents. Owing to their partly unsaturated character, these hydrocarbons are highly soluble in concentrated sulfuric acid and are separated from the crude mineral oils either by sulfuric acid or so-called selective solvents, as sulfur dioxide, benzene mixtures, furfurol, etc., which can be extracted from the residue mentioned by neutralization and/or distilling. If selective solvents are employed the hydrocarbons may be applied directly after the removal of the solvents.

In the same way other high-boiling unsaturated and/or polycyclic hydrocarbon mixtures can be used according to the invention, and also products containing them in larger quantities and occurring either in nature like miri oil of Borneo, rich in substances showing a tendency to resinify, or obtainable by synthesis.

Additions of the class mentioned to the polymerization products o.· mixed polymerization products during thermal decomposition insure not only good workability but also preserve these products to a considerable extent due to the fact that access of atmospheric oxygen is rendered more difficult. The quality of the vulcanizates made from products according to the invention is not only maintained by the additions but notably improved thereby.

As hydrocarbon mixtures of the kind specified have proved excellent aids, usable also in relatively large quantities, in natural and synthetic rubber and rubberlike substances, their employment according to the invention is often particularly desirable.

Another important feature is that the temperature and also the duration of the heat treatment can be reduced in thermal decomposition while using the substances mentioned. As under existing conditions the decomposition temperature must be in the neighborhood of, say, 140° C. to have good effects, it will be understood how valuable an agent is through which these conditions which are quite severe for the unstable mixed polymerization products may be modified.

Dispersion of the hydrocarbons or hydrocarbon mixtures to be added in a manner most favorable to the performance of the process can be attained by carefully mixing crumbs or bits of the polymerization or mixed polymerization products with the hydrocarbon mixture, made thinly liquid by slight heating, in a suitable apparatus. It is further possible to bring about a particularly fine dispersion of the hydrocarbon mixture in the products mentioned by adding to emulsions of the latter the hydrocarbon mixtures according to the invention in emulsified form or emulsifying them therein and then coagulating this mixture, whereupon the coagulum formed is freed by washing from most of the dispersing or emulsifying agents and subjected to the usual subsequent treatment.

The following example has been found to give good results:

*Example*

A mixed polymerization product of butadiene and styrene, known under the trade name "Buna-S," was mixed in a suitable apparatus with 15% of a product obtained by neutralizing an acid tar obtained by refining heavy mineral oils with concentrated $H_2SO_4$ and subsequent distillation. The mixture was heated to 135° to 140° C. for one to two hours in the presence of air, then homogenized on a roller and used for preparing a mixture having the following composition:

| | Parts |
|---|---|
| Treated substance | 1,150 |
| Activated lampblack | 470 |
| Zinc oxide | 47 |
| Sulfur | 1.8 |
| Stearic acid | 1.8 |
| Vulcanizing agent | 1.2 |

In a parallel experiment the synthetic rubber alone was subjected to thermal treatment and the adjuvant substance mentioned, in accordance with the usual practice, admixed only after the thermal treatment of the synthetic rubber together with the other additions. The preparation of a homogeneous mixture was in this instance more difficult and consumed more time.

During the continuous heating in stages of 20, 30 and 40 minutes at 133° C. the following data could be observed:

| | Resistance to fracture | Breaking elongation or stretch |
|---|---|---|
| | Kg./cm.² | Per cent |
| Normally decomposed substance | 20′ 135 | 551 |
| | 30′ 183 | 520 |
| | 40′ 175 | 426 |
| Substance treated according to invention | 20′ 168 | 571 |
| | 30′ 207 | 558 |
| | 40′ 186 | 485 |

These data clearly show that the process according to the invention yields vulcanizates of higher value.

What is claimed is:

1. The process of rendering workable the copolymers of butadiene and styrene which consists in mixing said polymers with an unsaturated neutral distillation residue from mineral oil treated with concentrated sulphuric acid and thereafter subjecting the mixture to approximately 135° C. for from one to two hours.

2. The process of rendering workable the copolymers of butadiene and styrene which consists in mixing said polymers with an unsaturated neutral distillation residue from mineral oil treated with concentrated sulphuric acid and thereafter subjecting the mixture in the presence of oxygen to approximately 135° C. for from one to two hours.

3. The process of rendering workable the copolymers of butadiene and styrene which consists in mixing said polymers with about fifteen percentum of an unsaturated neutral distillation residue from mineral oil treated with concentrated sulphuric acid and thereafter subjecting the mixture to approximately 135° C. for from one to two hours.

4. The process of rendering workable the copolymers of butadiene and styrene which consists in mixing said polymers with about fifteen percentum of an unsaturated neutral distillation residue from mineral oil treated with concentrated sulphuric acid and thereafter subjecting the mixture in the presence of oxygen to approximately 135° C. for from one to two hours.

5. The process of rendering workable the copolymers of butadiene and styrene which consists in mixing small particles of said polymers in an unsaturated neutral distillation residue from mineral oil treated with concentrated sulphuric acid thereafter maintaining the mixture at approximately 135° C. for from one to two hours.

CARL ZERBE